March 13, 1951     H. E. REPPERT ET AL     2,545,385
AUTOMATIC SELF-REELING FISHING FLOAT
Filed Sept. 27, 1949
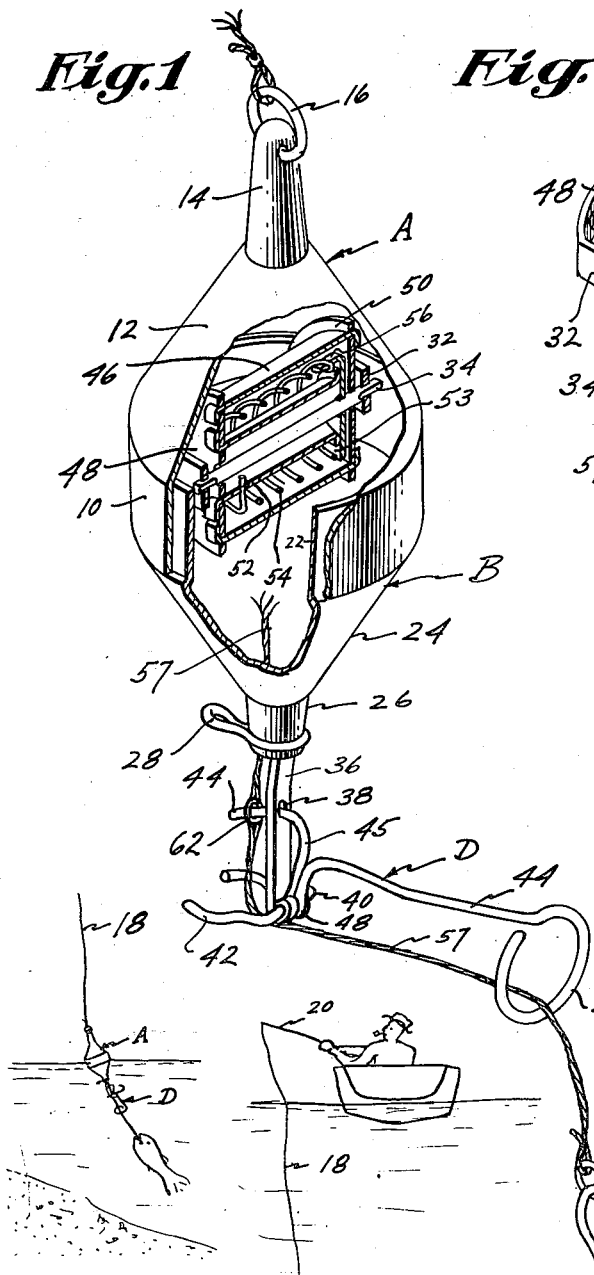
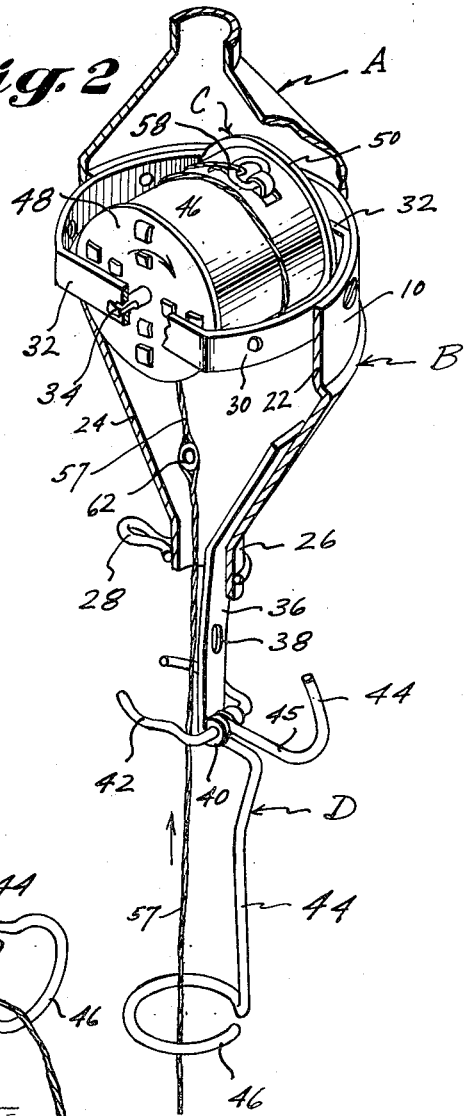
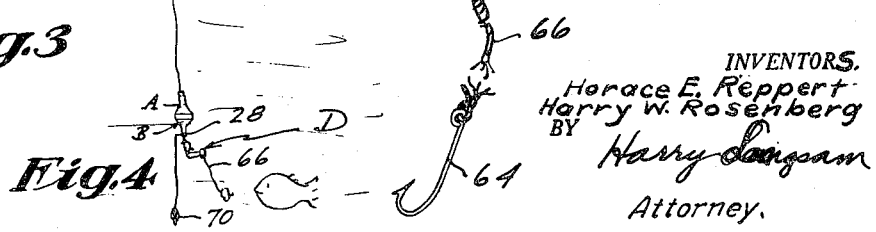
INVENTORS.
Horace E. Reppert
Harry W. Rosenberg
BY
Harry Langsam
Attorney.

Patented Mar. 13, 1951

2,545,385

UNITED STATES PATENT OFFICE 2,545,385

AUTOMATIC SELF-REELING FISHING FLOAT

Horace E. Reppert and Harry W. Rosenberg, Philadelphia, Pa.

Application September 27, 1949, Serial No. 118,012

2 Claims. (Cl. 43—15)

Our invention relates to fishing floats, and is directed particularly to a float which is triggered by the nibble of a fish into reeling in a hook a short distance, thereby hooking the fish securely. The float does not reel in the fish, but firmly hooks the fish, thereby insuring a positive strike.

In the past, fishing floats having this function have been constructed, but they have suffered from various drawbacks. These floats have required excessive pull to trigger the action, and are relatively dangerous to load and to use.

Accordingly, an object of our invention is to provide a float having self-contained means for reeling in the hook a short distance upon being actuated by a nibble.

Another object of our invention is to provide a float of the character described which has a trigger of exceptional smoothness and simplicity which is actuated by a light pull by the fish.

Another object of our invention is to provide a float of the character described which is much safer to use than the previous devices.

Another object of our invention is to provide a float which can be used for surface fishing, as in a bay, or which can be weighted down with a sinker for deep sea fishing.

Other objects of our invention are to provide an improved device of the character described, that is easily and economically produced, which is sturdy in construction and which is highly efficient in operation.

With the above and related objects in view, our invention consists in the details of construction and combination of parts, as will be more fully understood from the following description, when read in conjunction with the accompanying drawing in which:

Fig. 1 is a perspective view of the fishing float in loaded position.

Fig. 2 is a perspective view of the fishing float in triggered position, the walls being partly cut away to reveal the interior.

Fig. 3 is a fragmentary view of the float used for surface fishing.

Fig. 4 is a fragmentary view of the float submerged for deep-sea fishing.

Referring now to the drawing, wherein similar reference characters designate similar parts, we show a fishing float having a housing formed by two funnel-shaped members. The top housing member, generally designated as A, has a cylindrical portion 10, a conical portion 12, and a tapered post 14, to which the line ring 16 is affixed. The line 18 dangling from the pole 20 is attached to this ring 16.

The lower housing member, generally designated as B, has a cylindrical portion 22 which nests within the cylindrical portion 10 of the upper housing member A, and a conical portion 24. A short tailpiece 26 attached to the conical portion 24 carries a sinker supporting ring 28.

The winding reel, generally designated as C, is supported within the lower housing member B upon a substantially circular chassis 30 having flattened opposite sides, each designated as 32. The chassis is fastened to the inner surface of cylindrical portion 22 by spot welding or screws. The winding reel C is a hollow cylinder revolving upon an axle 34, the axle being fixedly supported in the flattened sides 32 of the chassis. A trigger-support bracket, generally designated as 36 is attached to the inner surface of the portions, 24 and 26. This bracket has a hole 38, and a rolled end 40 slotted at the middle. Guard 42 passes through the rolled end 40, and serves as an axle for the trigger D which projects through the slotted portion of the rolled end 40. The guard prevents the leader from whipping sidewise while being wound.

The trigger D is a wire having a straight portion 44, a circular open ring 46 formed at one end, an eye 48 which pivots upon the central portion of the leader guard 42, and an arcuate end or sear 44 which holds the leader in loaded position.

The winding reel C contains a coil spring mechanism shown in Fig. 1. The reel comprises a drum 46 having end plates 48 and 50. A hollow cylinder 52 is attached to plate 48 at one end, and its free end bears against a circular plate 53 swedged to the axle 34. The axle passes through the end plates 48 and 50, which rotate thereon, and the axle ends are fixedly held in the chassis. A coil spring 54 has one end secured to the cylinder 52 near plate 48, and has the other end fastened to a lug 56 struck inwardly from plate 53.

It can be seen that the entire reel B, when revolved upon axle 34, winds up the coil spring 54.

The leader wire 57 is attached at one end 58 to the drum, and is wound around the drum. The free end is pulled down through the tailpiece thereby winding up the spring and terminated in a stop ring 60 which is made larger than the tailpiece. An eyelet 62 is soldered to the leader wire a short distance back of the stop ring 60. The hook 64 is supported upon a snell 66 which is detachably secured to the stop ring 60 by means of a snap ring 68.

To load, the float is held inverted in one hand, whereby the weight of the trigger ring 46 causes the sear 44 to project through the hole in the bracket. As a safety measure, one finger of the hand is placed over the trigger portion 45 between the eye and the sear, to keep the trigger in this position. The stop ring is pulled away from the tailpiece until the eyelet 62 appears. The eyelet is then slipped over the sear, and the leader is passed through the guard 42 and the open trigger ring 46.

The previously-baited hook snell is then attached to the stop ring by means of the snap ring 68, the finger is removed, and the entire assembly is cast overboard.

When a fish exerts a tug upon the baited hook, the arcuate sear is withdrawn through the bracket hole, releasing the leader wire. The coiled spring instantly rewinds the leader until the stop ring snubs up against the tailpiece, causing the hook to become securely imbedded in the fish.

The straight portion 44 of the trigger is made several times as long as the portion 45, to obtain a mechanical advantage so that little pull is needed to release the trigger.

For shallow water fishing, the invention floats upright upon the surface, as in Fig. 3. For deep-sea fishing, the float is weighted down by a sinker 70 attached to the sinker ring 28. No water can enter the hollow float by virtue of the upright position which the float assumes in the water.

All parts of the float are made of rustproofed material to resist corrosion.

By holding the trigger closed with the finger while attaching the hook snell, it is impossible for the float to wind up while loading. Accordingly, the float is extremely simple and safe to use.

For commercial fishing where large numbers of baited hooks are attached to lines, a float may be provided for each hook.

Although our invention has been described in considerable detail, such description is intended as being illustrative rather than limiting, since the invention may be variously embodied, and the scope of the invention is to be determined as claimed.

We claim as our invention:

1. A fishing float, comprising a housing having a tailpiece at the bottom, a spring-wound reel supported within the housing, a bracket attached to the housing, an aperture in said bracket, a trigger having an arcuate sear at one end and an open ring at the other end, and a leader wound upon said reel and projecting through said tailpiece, an eyelet attached to said leader, said eyelet being held by said sear projecting through the bracket aperture, and a stop ring attached to the end of said leader, said stop ring being larger than the interior of the tailpiece, the leader end being passed through the open ring whereby tension on the leader end causes the sear to be withdrawn through the bracket aperture, releasing the eyelet.

2. Our invention as described in claim 1, including a guard ring attached to said bracket, and including a fish hook detachably secured to said stop ring.

HORACE E. REPPERT.
HARRY W. ROSENBERG.

REFERENCES CITED

The following references are of record in the file of this patent:

UNITED STATES PATENTS

| Number | Name | Date |
| --- | --- | --- |
| 384,853 | Keller | June 19, 1888 |
| 1,816,235 | Schroeder | July 28, 1931 |
| 1,866,864 | Schroeder | July 12, 1932 |